March 27, 1928.
J. H. MILLER
ELECTRICAL MEASURING INSTRUMENT
Filed March 25, 1922
1,663,768
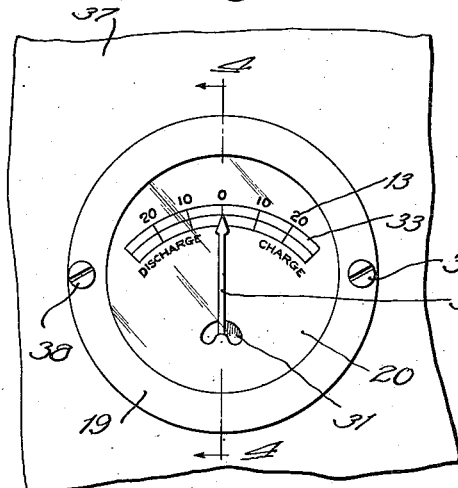
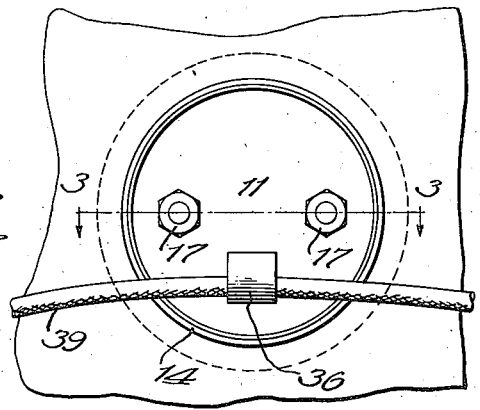
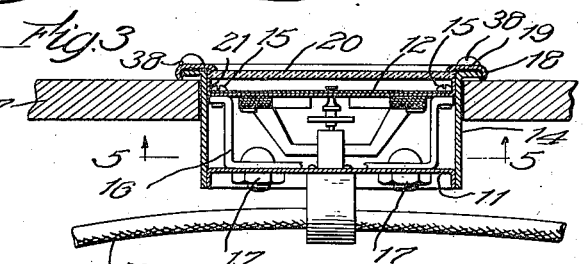
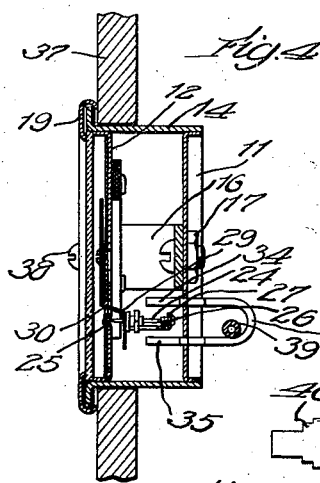
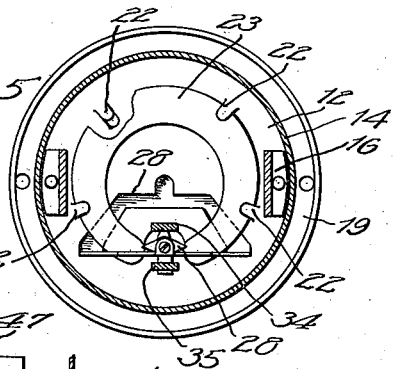
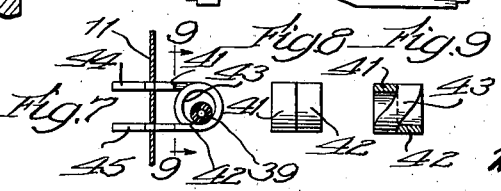

Patented Mar. 27, 1928.

1,663,768

UNITED STATES PATENT OFFICE.

JOHN H. MILLER, OF OAK PARK, ILLINOIS, ASSIGNOR TO JEWELL ELECTRICAL INSTRUMENT COMPANY, OF CHICAGO, ILLINOIS, A CORPORATION OF ILLINOIS.

ELECTRICAL MEASURING INSTRUMENT.

Application filed March 25, 1922. Serial No. 546,924.

This invention relates to electrical measuring instruments, and the present disclosure is particularly directed to an instrument for determining the amount and direction of flow of electrical current through a conductor.

One of the features of the invention is the provision of an instrument of this character in which the necessity of the usual binding posts and leading in and out conductors is avoided.

Another feature of the invention is the provision of means extending externally of the instrument housing through which the conductor may be passed, and which will act to produce the necessary torque on the vane of the indicating needle of the instrument.

A further feature of the invention is the provision of a torque producing means having a plurality of turns through which the electrical conductor may be passed, thus augmenting the turning effect on the needle vane.

Referring to the drawings,

Figure 1 is a face view of applicant's invention;

Figure 2 is a rear view of the same showing one form of the torque producing means extending beyond the casing;

Figure 3 is a section substantially on the line 3—3 of Figure 2;

Figure 4 is a section on the line 4—4 of Figure 1;

Figure 5 is a section on the line 5—5 of Figure 3;

Figures 6 to 10 inclusive show a modified form of the torque producing means in which a plurality of turns is provided through which the conductor may pass;

Figure 6 shows the blank from which the torque producing means is formed;

Figure 7 shows an edge view of the torque producing means, the rear plate of the instrument housing and the conductor passing through the loop in the torque producing means;

Figure 8 is a view of the device of Figure 7, as seen from the right;

Figure 9 is a section on the line 9—9 of Figure 7, and

Figure 10 is a side elevation of the device of Figure 9.

The applicant's invention in the present application is shown as embodied in an ammeter, although it will be readily understood that its use is not limited to ammeters. In ammeters with which applicant is familiar, it has been the usual practice to provide a coil about the torque producing structure, the ends of which coil are joined to binding posts on the outside of the ammeter housing. In the present embodiment of the invention, the torque producing structure extends through the housing, and the conductor carrying the electrical current to be measured is merely passed through a loop, thus avoiding the necessity of binding posts and materially simplifying the structure, both as to manufacture and as to the manner of connecting it to the circuit.

It is believed that the invention will best be understood by a detailed description thereof taken in connection with the accompanying drawings, in which like reference characters in the several views indicate like parts.

The instrument housing consists of the back plate 11, the front plate 12 in engagement with which lies the dial 13, and the cylindrical member 14 which engages the outer flanged edges of the plates 11 and 12. Secured to the front plate 12, by means of the screws 15, is the yoke member 16 to which is secured the back plate 11 by means of the bolts or other securing devices 17. Thus, the plates 11 and 12 are rigidly maintained in spaced and substantially parallel relation.

The housing cylinder 14 is provided with an outwardly projecting flange 18 over which is positioned the annular clamping device 19. The ring 19 is arranged to have its inner edge overlie the glass face or crystal 20 of the device and secure it in engagement with the flange 21 formed on the edge of the face plate 12. The screws 15, in addition to securing the plate 12 to the yoke 16, also act to maintain the dial 13 in position on the plate 12.

Secured to the rear side of the face plate 12, by means of the lugs 22 struck up out of the face plate 12, is a permanent magnet 23. Rotatably mounted between the poles of the permanent magnet 23 is a pin 24. One end of the pin 24 is received in a depression 25 in the end of the bearing screw 26. The bearing screw 26 extends through the threaded opening in the end of the lug 27 which is formed integral with the yoke 28ª struck up from the face plate 12.

Rigidly secured to the pivot pin 24 is the vane 28 of magnetizable material, and one end of the pointer 29. The pointer 29 adjacent to the pin 24 is provided with an offset portion 30 which extends upwardly through a slot 31 in the face plate 12 and dial 13. The forwardly extending end 32 of the pointer is arranged substantially parallel to the dial and the end thereof is arranged to pass adjacent to a scale 33 on the dial. The attractive action of the permanent magnet 23 on the vane 28 acts to normally maintain the vane in the position indicated in Figure 5, and the needle 29 is so connected to the pin 24 that when the vane 28 is in normal position, the needle will point to the zero mark on the scale as indicated in Figure 1.

Extending through the housing plate 11 are the reduced end portions 34 and 35 of the substantially U-shaped member 36. The legs of the member 36 may be rigidly secured to the housing plate 11 in any desired manner. The ends 34 and 35 of the member 36 are positioned on opposite sides of the vane 28, and the axis thereof extends at right angles to the longitudinal axis of the vane 28 when in its normal position.

In Figures 3 and 4, 37 indicates an instrument board of any desired character to which the ammeter of the present invention may be secured by means of screws 38 which pass through the ring 19 and the flange 18 and into the instrument board.

Assuming that the instrument is in position, and it is desired to operatively connect it with the conductor carrying the current to be measured, all that is necessary is to thread the conductor 39 through the loop in the member 36 which extends externally of the housing, as indicated in Figure 4. The flow of current through the conductor 39 will act to set up magnetic flux in the member 36 which will produce a torque on the vane 28 tending to move the vane 28 and the parts carried thereby from their normal position. This turning movement produced by current through the conductor 39 will be proportional to the flow of current through the conductor and will be in one direction or the other depending on the direction of current flow, as is well understood in connection with devices of the general character of that herein disclosed.

In Figures 6 to 10 inclusive is shown a modified form of the torque member 36 of Figure 4. This form is like that of Figure 4, except instead of the portion of the device external to the instrument housing being merely U-shaped, as in Figure 4, this externally projecting portion is formed into a plurality of turns. The arrangement shown in Figures 6 to 10 inclusive has the externally extending portion provided with two turns. Following the principles herein disclosed, however, it is quite obvious that more than two turns may be provided.

In Figure 6 is disclosed the blank from which the torque producing member of this modification is formed. It consists of the parallelly extending portions 41 and 42 which are offset from each other by the diagonally extending portion 43 a distance equal to the width of either of the members 41 or 42. Thus, when the portions 41, 42 and 43 are coiled about a mandrel, a substantially cylindrical member is provided, as shown in Figure 7. The parallel forwardly extending ends 44 and 45 will project through the back plate 11 in the same manner as do the ends 24 and 25 to provide a field for the vane 28 when current flows through the conductor 39. The legs 44 and 45 may be maintained in place by inserting the shouldered portions 46 and 47 through openings of corresponding size in the plate 11 and then upsetting the corners of the shoulder so that the plate 11 will be, in effect, riveted on to the legs 44 and 45.

Due to the turns in the portions 41, 42 and 43 of the device of Figures 6 to 10, the flux produced in the legs 44 and 45 will be greater than in the form shown in Figure 4. Therefore, a greater torque will be produced on the vane 28.

While in the embodiment of applicant's invention herein disclosed, the torque producing member is shown as extending externally to the ammeter housing, it is to be understood that it may be positioned within the housing and openings provided in the housing through which the conductor may be threaded through the loop of the torque producing member. Also, in order that the device may be readily used for testing the current flowing through conductors, the loop of the needle deflecting member may be provided with a slight gap or a removable portion may be arranged to permit the insertion of the conductor in and its removal from the loop without interfering in any way with the conductor.

While certain modifications of applicant's invention are shown in the accompanying drawings and described in the specification, it is to be understood that applicant contemplates still further modifications and the invention is to be limited merely by the scope of the appended claims.

Having thus described the invention, what I claim is new and desire to secure by Letters Patent of the United States is:

1. In an electrical measuring instrument, a substantially cylindrical casing having an annular supporting flange extending at right angles to its axis, a facing ring turned over said flange and projecting into said casing, a transparent circular closure in said casing lying against said facing ring, a substantially cup shaped metal dial plate fitting in said casing with its open end against said transparent closure, and having a curved slot for a pointer, a cup shaped back plate closing the rear end of said casing, and a yoke rigidly joining said back plate and said dial plate.

2. In an electrical measuring instrument, a substantially cylindrical casing having an annular supporting flange extending at right angles to its axis, a facing ring turned over said flange and projecting into said casing, a transparent circular closure in said casing lying against said facing ring, a substantially cup shaped metal dial plate fitting in said casing with its open end against said transparent closure, and having a curved slot for a pointer, a cup shaped back plate closing the rear end of said casing, a yoke rigidly joining said back plate and said dial plate, a permanent magnet supported upon said dial plate in said casing, a magnetizable vane rotatably supported adjacent the poles of said magnet, a needle passing through said dial plate and mounted to rotate with said vane, and a loop of magnetizable material projecting from said back plate and having its ends disposed at equal distances from the poles of said magnet.

In witness whereof, I hereunto subscribe my name this 21 day of March, 1922.

JOHN H. MILLER.